Figure 2:
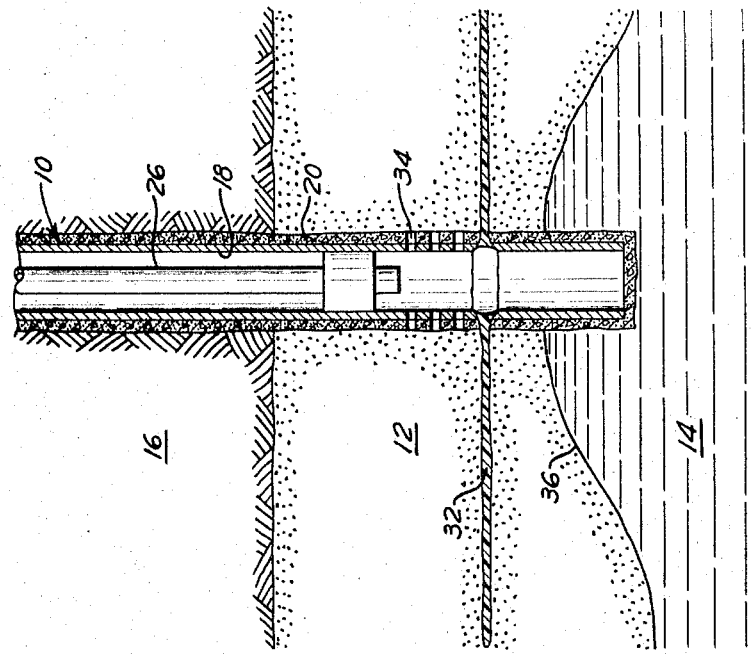

INVENTORS.
JIMMIE L. HUITT
BRUCE B. McGLOTHLIN
BY JOSEPH L. PEKAREK

ATTORNEY.

United States Patent Office 3,297,088
Patented Jan. 10, 1967

3,297,088
PROCESS FOR PREVENTING THE CONING OF AN UNDESIRABLE FLUID INTO A PRODUCTION WELL
Jimmie L. Huitt, Glenshaw, Bruce B. McGlothlin, O'Hara Township, Allegheny County, and Joseph L. Pekarek, Penn Hills, Pa., assignors to Gulf Research & Development Company, Pittsburgh, Pa., a corporation of Delaware
Filed Dec. 30, 1963, Ser. No. 334,101
12 Claims. (Cl. 166—33)

This invention relates to the production of fluids through wells penetrating underground fluid-bearing formations, and more particularly to the prevention of flow of undesired fluids into such wells simultaneously with desired fluids.

In many reservoirs oil is produced from an oil zone lying either over a water zone or beneath a gas zone. During production of oil from the reservoir, water underlying the oil may cone upwardly into the low pressure zone around the well and flow into the well at a level in the oil zone. Because the water frequently has a much lower viscosity than the oil, the water may flow more readily than the oil and create a water cone around the well substantially precluding entry of oil into the well. Water coning is especially serious in reservoirs subjected to a bottom water drive. Water coning may also be encountered in wells for the production of gas. A reduction in oil production and an increase in gas-oil ratio may be caused by gas coning. When gas coning occurs, the gas cones downwardly from its normal position overlying the oil to create an inverted gas cone precluding entry of oil into the well.

One method of preventing the coning of an undesired fluid into a well is to create an impermeable barrier extending substantially horizontally from a well into the zone of the desired fluid between the location at which that fluid enters the well and the zone of the undesirable fluid which is to be excluded. For example, if the barrier is to prevent water coning, the barrier is located above the upper boundary of the water zone and fluids are allowed to enter the well only above the barrier. A barrier having a radius of at least five feet and preferably ten feet or more is desirable. The pressure drop from the main body of the reservoir to the outer edge of the barrier is so small that the tendency of the undesired fluid to cone and enter the zone of the desired fluid at the outer edge of the barrier is substantially negligible.

Barriers suitable for exclusion of fluids other than oil from the oil zone can best be created by forming a substantially horizontal fracture extending from the well into the oil zone for the desired distance and filling the fracture with a solid material of low permeability. Portland cement is usually suggested for the creation of the barrier. Although Portland cement has a relatively low permeability, its permeability is significant and because of the large area of the barrier and the relatively large pressure drop near the borehole of the well, the total flow of undesirable fluid into the well through a Portland cement barrier can be substantial. Moreover, cement slurries are very easily dewatered by filtration of the water from the slurry through the formation. The resultant filter cake bridges the fracture and prevents flow of the cement slurry for any substantial distance outwardly from the well.

It has been suggested that resin-forming liquids be displaced down a well and outwardly into a fracture surrounding the well to create a barrier of the resin having a very low permeability compared with the permeability of Portland cement. The use of resin-forming liquids to create a barrier necessitates control over the operation which frequently is difficult to obtain in the field. It is essential that the resin-forming liquid does not set to form a resin in the pipe used to deliver the resin-forming liquid down the well. The resin-forming liquid then should set in a relatively short period after it is placed in the formation surrounding the well to avoid delay in creation of the barrier. Moreover, it is frequently difficult to obtain a barrier of substantial thickness by the injection of a resin-forming liquid into a fracture extending from the well. If the pressure in the well is maintained high enough to hold the fracture open, a substantial amount of the resin-forming liquid is displaced outwardly into the formation. If the pressure in the well is allowed to drop, the fracture closes and the thickness of the barrier is diminished. Special cements, designated as resin cements, have been developed to aid in the production of barriers of low permeability, but the cost of such cements has been excessive and they have not been widely used to prevent the coning of undesired fluids into wells.

This invention resides in the prevention of the flow of undesired fluids into a well used to produce a desired fluid from a zone of the desired fluid by the creation of a substantially horizontal fracture extending outwardly from the well into the zone of the desired fluid between the zone of the undesired fluid and the point of entry of the desired fluid into the well, and the displacement into the fracture of a slurry of deformable particles. Release of pressure in the well allows the faces of the fracture to deform the particles to fill the voids between the particles and thereby form a continuous barrier of low permeability extending from the well.

Figure 1:
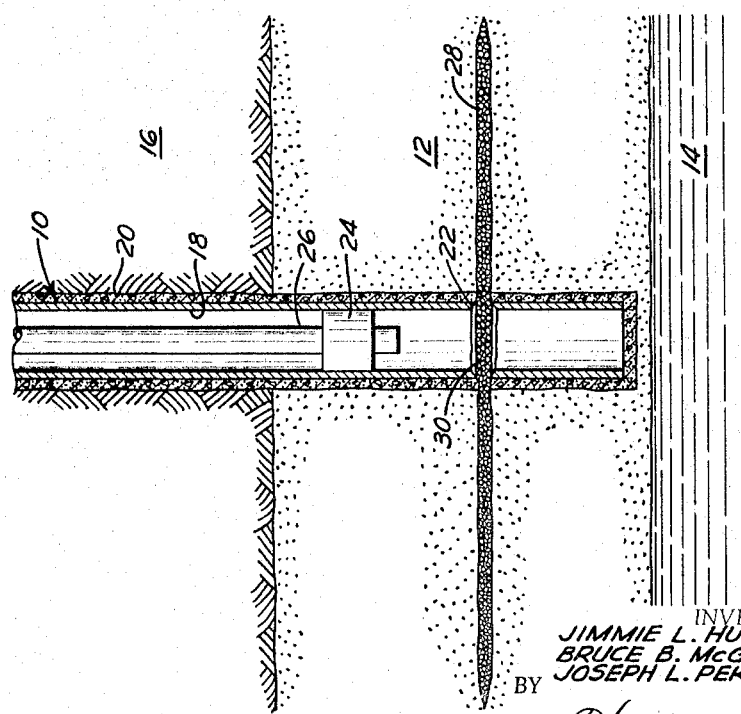

In the drawings:
FIGURE 1 is a diagrammatic view, partly in vertical section, illustrating a well having a substantially horizontal fracture extending therefrom filled with particles of a deformable material; and
FIGURE 2 is a diagrammatic view, partially in vertical section, of the well illustrated in FIGURE 1 after release of the pressure in the well and the well has been placed on production.

The process of this invention is useful in reducing coning of either water or gas into oil wells and for reducing flow of water into gas wells. For convenience, the process is described with reference to the drawing for reduction of water flowing into an oil well.

Referring to the drawings, a well indicated generally by reference numeral 10 is illustrated extending down into an oil-bearing formation having an oil zone 12 overlying a water zone 14. In the description of this invention with reference to the drawings, no gas zone is shown between the oil zone 12 and cap rock 16. A string of casing 18 extends downwardly into the oil zone 12 and is cemented in place by any conventional cementing procedure which forms a sheath 20 of cement surrounding the casing.

A circular notch 22 is cut through casing 18 and the sheath of cement 20 at the desired location of the barrier to expose a section of the pay zone 12 to allow the formation to be fractured. It is preferred that the notch be extended outwardly into the formation beyond sheath 20 to aid in the orientation of the fracture. The fracturing method described in United States Patent No. 2,699,212, suitably modified to make a horizontal rather than a vertical fracture, is a preferred method of making the fracture. A packer 24 is set in casing 18 above the notch 22 and a string of tubing 26 is run through the packer for delivery of a fracturing liquid into the casing below the packer 24.

A fracturing liquid is pumped down tubing 26 and through notch 22 into the formation at a rate causing the creation of a fracture 28 extending from the notch 22. The creation of a fracture is usually indicated by a drop in the pressure in the well. The fracturing liquid is followed by a liquid containing a suspension of deformable particles 30 in a concentration adapted to form at least a full monolayer of particles in the fracture 28. The concentration of the particles in the transporting liquid will depend in part on the characteristics of the liquid and the permeability of the oil-bearing zone 12. In general, the concentration of the solid particles in the transporting liquid will be in the range of two to ten pounds per gallon, and it is preferred that the concentration of the deformable particles be high enough to form a multilayer pack of particles in the fracture to reduce the possibility of a gap in the barrier.

After the fracture 28 has been packed with the deformable particles 30, the pressure in the well 10 is released to permit the faces of the fracture to move together and thereby compress the deformable particles. The particles deform sufficiently to fill the void spaces initially between the particles and form a continuous impermeable barrier indicated by reference numeral 32 in FIGURE 2. After release of pressure on well 10, it may in some instances be desirable to squeeze cement or a suitable plastic at a low pressure which will not harm the barrier 32 to fill the notch 22 in the cement sheath 20 or set a plug in the casing to a level just above the notch 22. The casing 18 and surrounding sheath of cement 20 are perforated, as indicated by reference numeral 34, in the oil zone above the barrier 32, and the well is placed on production by any conventional means. For example, if the pressure in oil zone 12 is not adequate to cause oil to flow to the surface, a pump, not shown, may be installed in the tubing 26 to lower the pressure within the casing and cause flow of fluids into the well.

The reduction in pressure in oil zone 12 adjacent the well resulting from placing the well on production causes the pressure in the reservoir above the barrier 32 to be lower than the pressure below the barrier 32. The resulting pressure difference causes a very slight flow upwardly through the barrier, which in turn causes water from the water zone 14 to cone upwardly as indicated by line 36 toward the lower surface of the barrier 32. Because of the very low permeability of the barrier 32 constructed in accordance with this invention, the rate of flow through the barrier is low and the pressure underneath the barrier will be only slightly less than the static reservoir pressure. The resultant relatively high pressure below the barrier 32 reduces the tendency of the water to cone and thereby reduces the size of the cone 36. As shown in FIGURE 2, the cone 36 may not rise as high as barrier 32, in which event production of water from zone 14 through the barrier is prevented. Even if the cone 36 should rise to the height of the barrier 32, the extremely low permeability of barrier 32 by reducing both the area of the barrier contacted by the coning water and the rate of flow per unit area through the barrier in that area contacted by the water greatly reduces the amount of water flowing into the well.

If a barrier constructed in accordance with this invention is used to prevent or reduce the coning of gas into an oil well, the barrier is located in the oil zone below the gas-oil interface. Fluids are then allowed to flow into the well only below the barrier. It is apparent that more than one barrier can be constructed if it is desirable to prevent flow of gas and water into an oil well. One barrier would be constructed below the gas-oil interface and another barrier above the water-oil interface. Production of oil would then be obtained by flow into the well between the two barriers.

The deformable particles suitable for deposition in a fracture to form a barrier on release of pressure holding the fracture open are those which at the reservoir temperature and overburden pressure will be deformed to a height not more than 70 percent of their unloaded height when subjected by the faces of the fracture to the load of the overburden. The term "deformable" means that the height of the particle is changed to the extent indicated without rupture of the particle. If the solid particles are originally placed in the fracture in a full monolayer, they should be deformable at the reservoir temperature and overburden pressure to not more than 60 percent, and preferably to 50 percent or less, of their unloaded height when subjected to the load of the overburden. If the fracture is originally packed with a mixture of particles of a wide range of particle sizes, particles of a material of slightly lower deformability can be used because of the lower percentage of voids in the pack.

The size of the particles is not critical as long as they are small enough to enter the fracture. Ordinarily the particles will have a maximum size of about four mesh in the U.S. Sieve series, but larger particles can be used if the fracture can be held open wide enough for the particles to enter. It is preferred that the particle size cover a relatively wide range; for example, a substantial portion, at least 20 percent, in the 20 to 40 mesh range, and at least 20 percent, in the 40 to 100 mesh range.

Preferred materials for the particles used in the creation of a barrier by this invention are water-and oil-resistant deformable plastic materials. Any of the water- and oil-resistant synthetic plastic materials, referred to as "synthetic rubbers" are suitable; the term "synthetic rubbers" being commonly used to designate plastic materials having little resistance to deformation when subjected to loading and capable of being elongated by at least 300 percent without rupture. It is apparent that the synthetic rubbers are more readily deformable than is necessary for this invention. Harder deformable plastic materials which would not meet the usual definition of a rubber also can be used.

Suitable synthetic rubbers or resins are the acrylic rubbers, neoprenes, and the polyester rubbers. Synthetic plastics or resins such as polyvinyl chloride, polyvinyl acetate, cellulose acetate, and polyolefin resin also can be used. Because temperature and pressure strongly influence the deformability of the plastics, the particular resin used will depend on the depth of the oil zone in which the barrier is used. Both temperature and pressure ordinarily increase with increases in depth; hence, harder, more rigid particles can be used for barriers at greater depts than can be used at shallower depts. The properties of the plastic deformable materials can be controlled by the degree of polymerization or the incorporation of plasticizers, for example, to make the plastics suitable for use in this invention. Oil-insoluble gums such as chicle also can be used.

As a specific example of the preparation of a suitable deformable material, three liters of distilled cyclohexane, 600 cc. of an alpha olefin fraction containing 20 to 26 carbon atoms per molecule, 3.76 grams of titanium chloride, and 1.62 cc. of triethyl aluminum were mixed at 60° C. for a period of 24 hours. The reaction was quenched with 200 cc. isopropanol, and the solid reaction product was washed twice; each time with 4 liters of isopropanol. The solid product was then given two washes of 4 liters each with methanol. The resulting curd was broken up in a Waring blender and dried at 50° C. in a vacuum oven to give 314 grams of a white powder of poly-$\gamma$-olefin. The poly-$\gamma$-olefin is suitable for deposition in a fracture and upon application of pressure at temperatures commonly encountered in subsurface formations, produces a barrier of very low permeability.

As an example of a polyvinyl chloride resin suitable for use in this invention, water and vinyl chloride are mixed in a 3:1 ratio in the presence of an organic peroxide catalyst and polyvinyl alcohol. The mixture is stirred until reaction is complete after which reaction product is stripped of unreacted monomer and dried. The polyvinyl chloride polymer is mixed hot with dioctyl phthalate to produce a rubbery material having the desired deformability.

A series of tests were performed to measure the permeability of barriers created in accordance with this invention. A core of Berea sandstone was cut in half to form a simulated fracture. Particles of a deformable solid material were placed on a face of the fracture and then compressed between the two faces of the fracture in a modified Hassler cell apparatus. Nitrogen under pressure was applied to one end of the core in a manner requiring flow through the barrier for the nitrogen to be discharged from the other end of the core. The permeability of the barrier was determined from the pressure drop across the barrier and the rate of flow through the barrier, and the "barrier effectiveness" was calculated from the permeability determination. "Barrier effectiveness" is defined as the barrels of water that would be produced each day through one square foot of the barrier with one p.s.i. pressure drop through the barrier. For purposes of comparison, a barrier one-eighth inch thick was constructed of Portland cement between the faces of the Berea sandstone core, and the permeability determined. The results of the tests are presented in Table I.

a barrier. In run 7, the ratio of thickness under pressure to the thickness under no load was 0.77 and the resultant barrier was ineffective. When the ratio of the thickness under load to thickness under no load decreased to 0.68, the barrier had sufficiently high resistance to flow to be useful in controlling water coning in many wells. A further decrease in the ratio to 0.55 or lower resulted in a barrier through which there was no flow under test conditions.

Examination of many of the barriers after the tests on which the results presented in Table I were obtained showed that the particles had been compressed into a continuous sheet. The particles were, in effect, cemented together by the application of the heat and pressure. The creation of a continuous sheet having substantial tensile strength precludes movement of individual particles from the barrier which might result in the creation of openings through the barrier.

An important advantage of this invention is the absence of any necessity of controlling chemical reactions taking place in the fracture down the well. The plastic

*Table I*

| Barrier Material | Size (Mesh USSS) | Type of Pack [1] | Test Temp. (° F.) | Test Press. (p.s.i.) | Barrier Thickness at Test Press. (cm.) | Ratio Thickness Under Press. to Thickness Under No Load | Barrier Effectiveness (bbl./day/sq. ft./p.s.i.) |
|---|---|---|---|---|---|---|---|
| 1. Portland Cement | | | 100 | 800 | 0.32 | | 0.04 |
| 2. Tygon [2] Shavings | | (2) | 75 | 4,000 | 0.046 | [3] (0.60) | 0.22 |
| 3. Tygon [2] Shavings | | (2) | 165 | 4,000 | 0.018 | [3] (0.55) | 0 |
| 4. Polyvinyl Chloride | 100–400 | (2) | 75 | 2,000 | 0.160 | 0.88 | 42.80 |
| 5. Polyvinyl Chloride | 100–400 | (2) | 75 | 4,000 | 0.137 | 0.78 | 0.05 |
| 6. Polyvinyl Chloride | 100–400 | (2) | 165 | 4,000 | 0.19 | 0.68 | 0.003 |
| 7. Methyl Methacrylate | 40–100 | (2) | 165 | 4,000 | 0.058 | 0.77 | >100 |
| 8. Poly-γ-olefin | 40–100 | (2) | 165 | 4,000 | 0.032 | [4] 0.50 | 0 |
| 9. Polypropylene | 8–12 | (1) | 212 | 3,000 | 0.060 | 0.53 | 0 |
| 10. Polyvinyl Acetate | 20–40 | (2) | 75 | 2,000 | 0.020 | [4] 0.56 | 0 |
| 11. Polyethylene | 4–8 | (1) | 165 | 4,000 | 0.058 | 0.51 | 0.01 |

[1] (1) Indicates a full monolayer pack.
(2) Indicates a multilayer pack.
[2] Tygon is a trademark of U.S. Stoneware Company for polyvinyl resins.
[3] These ratios are smaller than would be obtained for pellets of this material because the shavings had an irregular shape which gave an excessively high no load barrier thickness.
[4] Some of the plastic materials were extruded from the ends of the fracture.

An examination of Table I shows that the production of water through the barriers created by the application of pressure to the deformable solid particles in most cases is substantially less than the production of water through a Portland cement barrier. The rate of flow through the barriers constructed in accordance with this invention of solid particles having the necessary deformability was substantially less than the rate of flow through the Portland cement barrier even though the thicknesses of the barriers constructed in accordance with this invention were substantially less than the thickness of the Portland cement barrier. A comparison of run 1 with run 6 shows that the barrier of deformed polyvinyl chloride particles allowed the flow of water at a rate less than one-tenth as high as the rate of flow through the Portland cement barrier. As shown by run 3, Tygon shavings, a plasticized polyvinyl chloride, allowed complete shut-off of flow of nitrogen under test conditions.

It is apparent from Table I that the selection of the deformable material will depend upon the temperature of the oil zone in which the barrier is to be created and the overburden pressure. For example, at a temperature of 75° F., Tygon shavings were not effective in creating an impermeable barrier even though the shavings were compressed under a pressure of 4,000 pounds per square inch. An increase in the temperature to 165° F. resulted in the barrier having no measurable permeability. The effect of pressure is illustrated by comparison of runs 4 and 5. An increase in the pressure from 2,000 pounds per square inch to 4,000 pounds per square inch reduced the flow through the barrier from 42.80 bbls./day/sq. ft./p.s.i. to 0.05 bbl./day/sq. ft./p.s.i.

Runs 6 through 9 show the significance of the deformability of the particles to their effectiveness in creating a barrier. The plastic deformable particles can be compounded under carefully controlled conditions in their manufacture. Since chemical reaction is not essential to the creation of the barrier, full control of the properties of the barrier is possible. Moreover, the cementing of the particles into a continuous sheet occurs very rapidly.

We claim:

1. A method of reducing the production into a well of an undesirable fluid with a desirable fluid from an underground formation having a zone of the undesirable fluid adjacent a zone of the desirable fluid comprising creating a substantially horizontal fracture extending from the well into the zone of the desirable fluid, displacing particles of a material insoluble in oil and in water into the fracture in an amount forming at least a full monolayer of the particles in the fracture, said particles being deformable to form a continuous barrier of low permeability when subjected to the overburden pressure at the temperature of the zone of desirable fluid reducing the pressure in the formation by producing the well to let the deformable particles be subjected to the overburden pressure, and withdrawing the desirable fluid from the underground formation into the well at a location in the zone of desirable fluid more remote than the barrier from the zone of undesirable fluid.

2. A method as set forth in claim 1 in which the desirable fluid is oil and the undesirable fluid is water, and the oil is withdrawn into the well from the oil zone at a location above the barrier.

3. A method as set forth in claim 1 in which the desirable fluid is oil and the undesirable fluid is gas, and the oil is withdrawn from the formation into the well at a location below the barrier.

4. A method as set forth in claim 1 in which the desirable fluid is natural gas and the undesirable fluid is water, and the natural gas is produced into the well at a location above the barrier.

5. A method as set forth in claim 1 in which the particles are deformable without fracture to a height less than 70 percent of their unloaded height when subjected to the overburden pressure at the reservoir temperature.

6. A method as set forth in claim 1 in which the particles are of a wide range of sizes capable of being displaced into the fracture; at least about 20 percent of the particles being in the 20 to 40 mesh range in the U.S. Sieve series and at least 20 percent being in the 40 to 100 mesh range in the U.S. Sieve series.

7. A method as set forth in claim 1 in which the particles are placed in the fracture in a full monolayer and are deformable at the reservoir temperature and by the overburden pressure to not more than 60 percent of their unloaded height.

8. A method as set forth in claim 1 in which the deformable materials are synthetic organic plastics.

9. A method as set forth in claim 1 in which the deformable particles are composed of a synthetic plastic selected from the group consisting of polyolefins, polyvinyls, and cellulose acetate.

10. A method as set forth in claim 1 in which the deformable particles are composed of a gum insoluble in oil and in water.

11. A method as set forth in claim 1 in which the particles are composed of a synthetic rubber insoluble in oil and in water.

12. A method of producing oil from an oil zone having a water zone below the oil zone comprising setting casing into the oil zone, cutting a horizontal notch through the casing and into the surrounding formation, said notch being located in the oil zone, pumping a liquid down the well and increasing the pressure on said liquid to create a fracture extending outwardly from the notch, displacing a liquid having 2 to 10 pounds per gallon of particles of a deformable material down the well and into the fracture, releasing the pressure in the well to deposit the particles of deformable material in the fracture, said particles being deformable at the reservoir temperature by the overburden pressure to a height less than about 70 percent of their unloaded height whereby the overburden pressure compresses the particles into a continuous barrier perforating the casing in the oil zone above the continuous barrier, and producing oil through the perforations.

References Cited by the Examiner

UNITED STATES PATENTS

| | | | |
|---|---|---|---|
| 2,368,424 | 1/1945 | Reistle | 166—42.1 X |
| 3,089,542 | 5/1963 | Kolodny | 166—42.1 |
| 3,145,773 | 8/1964 | Jorda et al. | 166—33 X |
| 3,149,673 | 9/1964 | Pennington | 166—42.1 |
| 3,193,011 | 7/1965 | Rickard | 166—33 |
| 3,237,690 | 3/1966 | Karp et al. | 166—33 X |

CHARLES E. O'CONNELL, *Primary Examiner.*

JACOB L. NACKENOFF, *Examiner.*

S. J. NOVOSAD, *Assistant Examiner.*